Aug. 7, 1962 V. HOFMANN 3,048,711

TRANSISTOR REVERSIBLE COUNTING CIRCUIT WITH RESISTIVE COUPLING BETWEEN STAGES

Filed Nov. 28, 1958 2 Sheets-Sheet 1

WITNESSES

John E. Healy, Jr.

James F. Young

INVENTOR

Viktor Hofmann

BY R. J. Brodahl

ATTORNEY

Aug. 7, 1962 V. HOFMANN 3,048,711

TRANSISTOR REVERSIBLE COUNTING CIRCUIT WITH RESISTIVE COUPLING BETWEEN STAGES

Filed Nov. 28, 1958 2 Sheets-Sheet 2

United States Patent Office 3,048,711

Patented Aug. 7, 1962

3,048,711

TRANSISTOR REVERSIBLE COUNTING CIRCUIT WITH RESISTIVE COUPLING BETWEEN STAGES

Viktor Hofmann, Erlangen, Germany, assignor to Siemens-Schuckertwerke Aktiengesellschaft, Erlangen, Germany, a corporation of Germany Filed Nov. 28, 1958, Ser. No. 777,061
Claims priority, application Germany Dec. 5, 1957
3 Claims. (Cl. 307—88.5)

Figure 1:
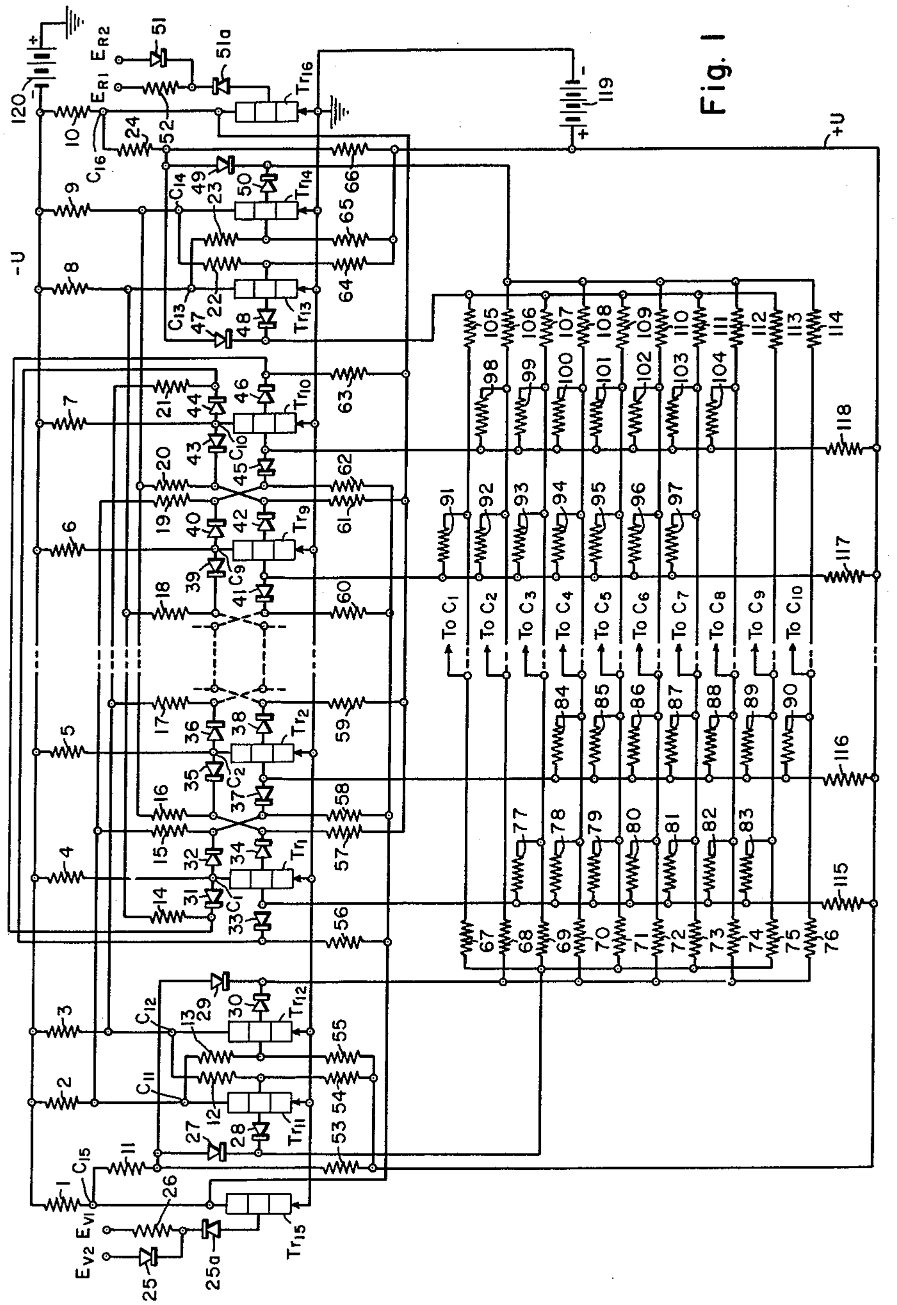

The present invention relates to signal counter apparatus adapted to count or control sequential operations. Corresponding to these operations are signal changes in electric voltages or currents which are applied to the counting device as control signals.

Counting circuits often find application in control arrangements of various types. Circuits employing tubes are not very suitable for use in arrangements in which mechanical stresses on the counting or control device must be expected, because the conventional electronic discharge tubes generally are sensitive to shocks. Furthermore, it is often undesirable to have two separate operating voltage supplies, such as required for the filament voltage and anode voltage, especially since the anode voltage makes necessary the provision of a higher potential.

The well known mechanical stepping devices of the type frequently utilized in controls for machine tools also are sensitive to shock, dust, and the like and, besides, they are subject to a certain amount of wear so that they are not always reliable enough. The switching speed of a mechanical stepping device is limited, whereas for many applications, e.g. for measuring controls, higher stepping speeds are required and counting in forward as well as backward or reverse directions at a frequency of several kilocycles is often necessary.

For these reasons it has already been proposed to use controllable semiconductors, particularly transistors, for designing counting circuits. This makes it possible to start with decade counting systems and then to combine several such decade counters so as to form a decimal counting system. However, besides using decade systems, it is also readily possible to choose other intervals as may be desired, such as five-stage or two-stage systems or systems with as many as twenty and more stages. The individual counting steps are stored, until the next input counting signal or impulse, in electrical or electronic memory circuits, e.g. in bistable trigger circuits. The trigger circuits for the individual stages which represent counting steps generally are capacitively coupled with each other.

For the purpose of translating the various signal combinations of the binary system, for example, into the more customary decimal system which is also more suitable for evaluation purposes, it is necessary to provide special translating means which, however, cause a weakening of the signals and also have a number of other drawbacks.

As mentioned before, in the known counting circuits employing tubes or transistors, each counting step is usually stored by means of a bistable trigger circuit. In circuits operating with tubes, discharge vessels having twin discharge paths may be used for that purpose. If transistors are employed, the characteristic of point-contact transistors can be utilized which has two stable states so that only one single point-contact transistor would be sufficient for providing a bistable circuit. These transistors, however, have various disadvantages which make them unsuitable for some applications. Therefore, consideration has been given to the use of transistors which have only one stable state, as is the case, for example, with junction transistors. Thus, each bistable trigger circuit requires two junction transistors. Some thought could also be given to the use of composite transistors which would then correspond to two separate transistors similar to the duplex type discharge tubes.

It is an object of the present invention, to permit the use of transistors, particularly junction transistors, so that only one single transistor is required for each stage corresponding to a counting step. The present invention resides in that in using controllable semiconductors, particularly transistors having only one stable state of operation, a number of controllable semiconductors, particularly transistors, within a decade or any other given interval, corresponding to the number of the stages associated with the individual counting steps, are connected, on the one hand, for the purpose of permitting forward as well as backward counts, through a resistance network so as to form a feedback loop such that the arrangement has as many stable states as there are stages in said interval, and that, on the other hand, a gate coupling consisting of diodes and resistors, in combination with a trigger means each for forward and backward counts, is provided for the control signals.

Further features of the invention will become more readily apparent from the following description of the invention given with reference to the accompanying drawings, the figures of which are simplified illustrations of embodiments of the invention schematically showing the components which are essential for a clear understanding of the invention.

Figure 2:
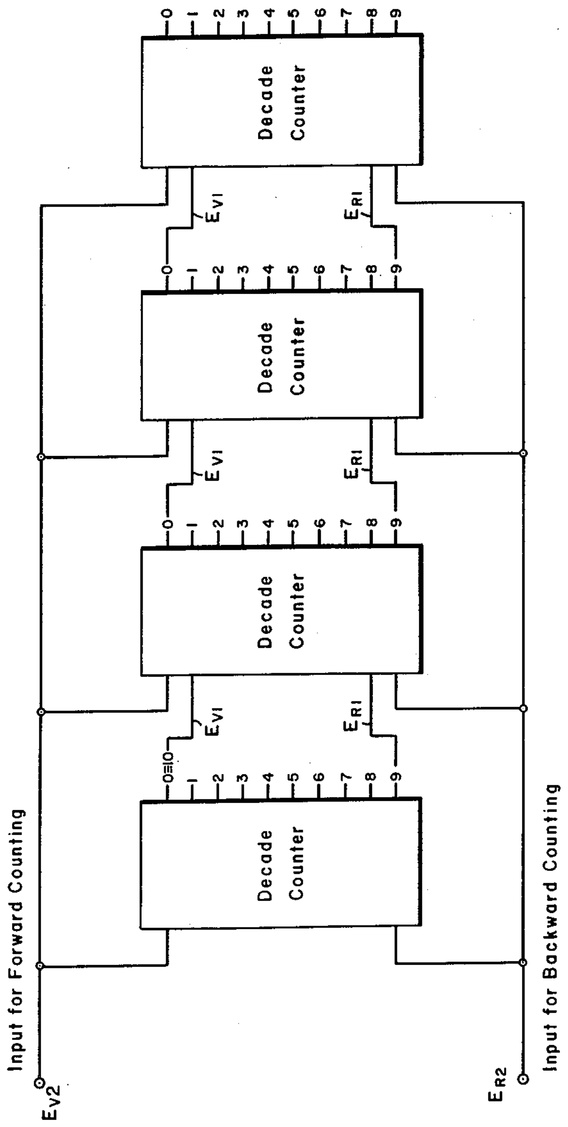

In FIGURE 1 there is provided a schematic showing of a decade counter device in accordance with the present invention, and In FIGURE 2 there is provided a diagrammatic showing of a decade counter system for four decimals.

The embodiment illustrated in FIG. 1 represents a decade counter comprised of ten transistors, which can be used in any desired manner for counts in both the forward and backward direction. The arrangement having ten transistors in the decade counter has ten stable states.

The transistors of the decade counter are designated from $Tr_1$ to $Tr_{10}$. By providing a suitable gate coupling circuit consisting of diodes and resistors, and a bistable input stage preferably comprised of two transistors, the forward-count impulses applied to the input are caused to successively render the individual transistors non-conductive. Therefore, depending upon the counting step reached, the corresponding counting signal can be obtained from the corresponding collector of one of the transistors.

The control voltages for forward and backward counts are applied to different input terminals of the arrangement. Terminals $E_{V1}$ and $E_{V2}$ are provided for forward counts, and terminals $E_{R1}$ and $E_{R2}$ are provided for reverse or backward counts; $E_{R2}$ and $E_{V2}$ being required only when several of these decade counters are combined to form a decimal counting system. It is assumed that the applied input signal or control voltage which may be any one of an alternating voltage, a direct voltage with changing polarity, or an impulse voltage, is impressed on the input $E_{V2}$ or $E_{R2}$ so that these input terminals normally have a zero potential and then, upon application of a control signal, have a negative potential. The shape of the control voltage curve in itself is substantially of no consequence. It is only necessary that a predetermined minimum amplitude be reached which, however, may be very small and depend on the input impedance. Thus, it is also readily possible to obtain the control voltages with the aid of a switching device, for example, by means of an end switch.

For forward-counting, a bistable input stage formed by the two transistors $Tr_{11}$ and $Tr_{12}$ is connected ahead of the decade counter. For backward-counting there is provided a similar trigger stage consisting of transistors $Tr_{13}$ and $Tr_{14}$. The other transistors $Tr_{15}$ and $Tr_{16}$ connected into the respective input circuits have the function of amplifying the signals and, therefore, are not immediately necessary for the counting device.

The mode of operation of the decade counter is as follows:

It is assumed that initially the transistor $Tr_1$ is non-conductive, and that neither a forward-count nor a backward count input signal is present. Consequently, the transistors $Tr_{15}$ and $Tr_{16}$ are in a non-conductive state.

Control current flows through the base element of transistor $Tr_{11}$ through the diode 28 and resistor 67 which is connected to the collector element $C_1$ of transistor $Tr_1$. Likewise, a control current becomes effective through the base element of transistor $Tr_{13}$ and through the diode 48 and resistor 105 through the connection with the collector element $C_1$. Consequently, the transistor $Tr_{11}$ is saturated or conductive and the transistor $Tr_{12}$ is non-conductive. In the same manner, the transistor $Tr_{13}$ in the trigger stage of the input for reverse counts is saturated or conductive and the transistor $Tr_{14}$ is non-conductive.

Also, initially, the transistors $Tr_3$ to $Tr_9$ receive control current from the collector element $C_1$ of transistor $Tr_1$ through the illustrated resistance network including resistance members 67 to 118 and because the collector element of each transistor is connected to the base element of another transistor except for the two adjacent transistors $Tr_2$ and $Tr_{10}$. The adjacent transistor $Tr_2$ receives control current from the collector element $C_{15}$ through diode 37 and resistor 58. The other adjacent transistor $Tr_{10}$ receives control current from the collector element $C_{16}$ of transistor $Tr_{16}$ through the diode 46 and resistor 63. Thereby, the two adjacent transistors, namely, $Tr_2$ and $Tr_{10}$, as well as transistors $Tr_3$ to $Tr_9$ are initially conductive.

Now, depending on whether an input signal for a forward count or one for a reverse count is applied, either the transistor $Tr_{15}$ or $Tr_{16}$ can be driven to saturation and conduction. If, for example, the transistor $Tr_{15}$ is saturated, the diodes 27 and 29 will become conductive first on account of the voltage divider formed by the resistors 11 and 53 from the collector $C_{15}$ toward the positive terminal of the voltage source 119. Therefore, no current can flow through the diodes 28 and 30 any longer. Upon full saturation of the transistor $Tr_{15}$, the emitter element and collector element will now have therebetween the threshold voltage of several tenths of a volt. In this condition, however, no control current can flow through the resistor 58, the diode 37, and the base element of the transistor $Tr_2$. As a consequence, the transistor $Tr_2$ will now become non-conductive. Now the current flowing through the resistor 57 can no longer flow through the diode 35, but will flow through the diode 34 to the base element of transistor $Tr_1$ so as to drive the latter transistor to saturation. In this regard, it is assumed that the threshold values of the diodes in the base circuits of the transistors are higher than the threshold values of the diodes which are connected to the collector elements $C_1$ to $C_{10}$. The other transistors $Tr_3$ to $Tr_{10}$, remain in their unchanged saturated state, as before.

As soon as the counting signal disappears, the transistor $Tr_{15}$ will become non-conductive so that the collector $C_{15}$ will again become negative. The diodes 27 and 29, too, will again have cut-off voltage thereacross. Since now it is no longer the transistor $Tr_1$ but the transistor $Tr_2$ that is non-conductive, so that its collector element $C_2$ carries a negative signal, control current will flow through the diode 30 and resistor 68 through the base element of the transistor $Tr_{12}$, and through the diode 50 and resistor 106 through the base element of the transistor $Tr_{14}$. The transistors $Tr_{12}$ and $Tr_{14}$ are driven to saturation, and thereby the transistors $Tr_{11}$ and $Tr_{13}$ of the two input trigger circuits are rendered non-conductive. Upon the next input counting signal, which is impressed upon the base element of transistor $Tr_{15}$, the transistor $Tr_3$ will become non-conductive, and the cycle will be similarly completed in a manner corresponding to that hereinbefore described.

The application of input signals for backward-counts causes a similar operating cycle to take place. If a backward-count input signal is impressed upon the input $E_{R1}$, the transistor $Tr_{16}$ will saturate, and an operation similar to the one described above will ensue. If, for example, the transistor $Tr_3$ was the last to be non-conductive, it will now be the transistor $Tr_2$ which will assume a state of non-conduction.

As the device contains no coupling capacitor, that is, as a galvanic connection of the various stages is provided instead of the usual capacitive coupling, the counting speed is independent of frequency. The upper limit, for the counting frequency essentially is contingent only upon the switching time of the transistors. The galvanic coupling has the advantage that it makes the arrangement insensitive to interference impulses.

FIG. 2 is a block diagram showing a combination of several decade counters as shown in FIG. 1 for providing a decimal counting system of four decimals. In the manner illustrated, a plurality of decade counters can be connected as shown to form a larger decimal counting system. The signal for a forward count may be applied to the inputs $E_{V2}$ of all decade counters simultaneously. In that case, the terminal $E_{V1}$ is connected to the output of the zero stage of the preceding decade counter through a small capacitor. For backward counts, the input signals are connected to the inputs $E_{R2}$ of all decade counters simultaneously, and the terminal $E_{R1}$ is connected to the output of the ninth stage of the preceding decade counter in a similar manner.

I claim as my invention:

1. In a device for counting both forward and backward count input electrical signals, a plurality of counting stages each including a controllable semiconductor, a resistance network, with each of said semiconductors being connected for the purpose of permitting forward as well as backward counts through said resistance network to each of the other such semiconductors to form a feedback loop such that the arrangement has as many stable operative states as there are stages in said counting device, and at least one gate coupling circuit including at least a diode and a resistor member being operatively connected to at least one of said counting stages for receiving one of the forward and backward count input signals, with each of said semiconductors including a collector element and a base element, a plurality of diodes, with each collector element being connected to the base element of an adjacent semiconductor through a pair of said diodes connected in opposition, and with a circuit connection including a resistor being made between the collector element of each of the semiconductors and the base element of all other semiconductors except the two next adjacent semiconductors.

2. In a device for counting both forward and backward input electrical signals, a plurality of counting stages each including a controllable semiconductor, a resistance network, with each of said semiconductors being connected for the purpose of permitting forward as well as backward counts through said resistance network to each of the other said semiconductors to form a feedback loop having as many stable operative states as there are stages in said counting device, first gate coupling circuit including at least a diode and a resistor member operative with at least one of said counting stages for receiving each of the forward count input signals, and second gate coupling circuit including at least a diode and a resistor member operative with at least one of said counting stages for receiving each of the backward count input signals, with each of said semiconductors including a collector element and a base element, a plurality of diodes, with each collector element being connected to the base element of an adjacent semiconductor through a pair of said diodes connected in opposition.

3. In a device for counting both forward and backward input electrical signals, a plurality of counting stages each including a controllable semiconductor, a resistance network, with each of said semiconductors being connected for the purpose of permitting forward as well as backward counts through said resistance network to each of the other such semiconductors to form a feedback loop having as many stable operative states as there are stages in said counting device, and a pair of gate coupling circuits each including at least a diode and a resistor member and being provided for receiving a different one of the forward and backward count input signals, a pair of bistable trigger stages each comprising two semiconductors and being respectively connected between one of said gate coupling circuits and at least one of said plurality of counting stages and with each of said controllable semiconductors including a collector element and a base element, a plurality of diodes, with each collector element being connected to the base element of an adjacent semiconductor through a pair of said diodes connected in opposition.

References Cited in the file of this patent

UNITED STATES PATENTS

| | | |
|---|---|---|
| 2,656,106 | Stabler | Oct. 20, 1953 |
| 2,848,608 | Nienburg | Aug. 19, 1958 |
| 2,876,365 | Slusser | Mar. 3, 1959 |